United States Patent
Gilpin et al.

(10) Patent No.: US 9,985,970 B2
(45) Date of Patent: *May 29, 2018

(54) INDIVIDUALIZED AUDIT LOG ACCESS CONTROL FOR VIRTUAL MACHINES

(71) Applicant: Conjur, Inc., Weston, MA (US)

(72) Inventors: Kevin Gilpin, Weston, MA (US); Elizabeth Lawler, Weston, MA (US)

(73) Assignee: CONJUR, INC., Weston, MA (US)

( * ) Notice: Subject to any disclaimer, the term of this patent is extended or adjusted under 35 U.S.C. 154(b) by 111 days.

This patent is subject to a terminal disclaimer.

(21) Appl. No.: 14/510,230

(22) Filed: Oct. 9, 2014

(65) Prior Publication Data

US 2015/0350214 A1    Dec. 3, 2015

Related U.S. Application Data

(60) Provisional application No. 62/003,802, filed on May 28, 2014, provisional application No. 62/035,251, filed on Aug. 8, 2014.

(51) Int. Cl.
*H04L 29/06* (2006.01)
*G06F 9/455* (2018.01)

(52) U.S. Cl.
CPC .......... *H04L 63/10* (2013.01); *G06F 9/45558* (2013.01); *H04L 63/08* (2013.01); *G06F 2009/45595* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 8,352,941 | B1* | 1/2013 | Protopopov | G06F 9/45558 718/1 |
| 8,533,796 | B1 | 9/2013 | Shenoy et al. | |
| 8,800,009 | B1* | 8/2014 | Beda, III | H04L 63/0846 713/155 |
| 2003/0233385 | A1 | 12/2003 | Srinivasa et al. | |
| 2008/0072301 | A1 | 3/2008 | Chia et al. | |
| 2008/0201708 | A1 | 8/2008 | Carter | |
| 2010/0071035 | A1 | 3/2010 | Budko et al. | |
| 2010/0235830 | A1* | 9/2010 | Shukla | G06F 9/44526 718/1 |

(Continued)

*Primary Examiner* — Trang Doan
(74) *Attorney, Agent, or Firm* — Finnegan, Henderson, Farabow, Garrett & Dunner LLP

(57) ABSTRACT

To provide enhanced operation of computing systems to control access to audit logging resources by virtual machines, various systems, apparatuses, methods, and software are provided herein. In a first example, a method of operating a computing system is provided. The method includes receiving requests for audit credentials from virtual machines, and responsively providing individualized audit credentials to the virtual machines based at least on identities of the virtual machines. The method also includes, in the audit system, authorizing storage of audit data transferred by the virtual machines based at least on the individualized audit credentials accompanying the audit data. The method also includes, in the authorization system, selectively de-authorizing one or more of the virtual machines and reporting information regarding the de-authorized one or more of the virtual machines to the one or more audit systems.

22 Claims, 5 Drawing Sheets

(56) References Cited

U.S. PATENT DOCUMENTS

| | | | |
|---|---|---|---|
| 2010/0325727 A1* | 12/2010 | Neystadt | G06F 21/53 726/22 |
| 2011/0087888 A1 | 4/2011 | Rennie | |
| 2011/0154023 A1* | 6/2011 | Smith | G06F 21/78 713/155 |
| 2011/0197065 A1* | 8/2011 | Stauth | H04L 63/08 713/170 |
| 2012/0054486 A1* | 3/2012 | Lakkavalli | G06F 21/57 713/156 |
| 2012/0084847 A1 | 4/2012 | Balasubramanian et al. | |
| 2012/0096271 A1* | 4/2012 | Ramarathinam | H04L 63/0807 713/172 |
| 2012/0096525 A1 | 4/2012 | Bolgert et al. | |
| 2012/0173759 A1 | 7/2012 | Agarwal et al. | |
| 2012/0265976 A1* | 10/2012 | Spiers | H04L 63/0218 713/2 |
| 2013/0061293 A1* | 3/2013 | Mao | G06F 21/53 726/4 |
| 2013/0227303 A1* | 8/2013 | Kadatch | G06F 21/554 713/193 |
| 2014/0082349 A1* | 3/2014 | Zarfoss, III | H04L 63/08 713/155 |
| 2014/0282889 A1* | 9/2014 | Ishaya | H04L 63/08 726/4 |
| 2015/0160956 A1 | 6/2015 | Shah et al. | |

\* cited by examiner

INDIVIDUALIZED AUDIT LOG ACCESS CONTROL FOR VIRTUAL MACHINES

RELATED APPLICATIONS

This application hereby claims the benefit of and priority to U.S. Provisional Patent Application 62/003,802, titled "SYSTEMS, METHODS, AND SOFTWARE TO PROVIDE ACCESS CONTROL IN CLOUD COMPUTING ENVIRONMENTS," filed May 28, 2014, and which is hereby incorporated by reference in its entirety. This application also hereby claims the benefit of and priority to U.S. Provisional Patent Application 62/035,251, titled "INDIVIDUALIZED AUDIT LOG ACCESS CONTROL FOR VIRTUAL MACHINES," filed Aug. 8, 2014, and which is hereby incorporated by reference in its entirety.

TECHNICAL FIELD

Aspects of the disclosure are related to the field of access control in cloud computing environments, and in particular, providing access control for virtual machines in cloud computing environments.

TECHNICAL BACKGROUND

Virtualized computer systems are becoming increasingly deployed in computing environments. These virtualized computer systems include virtual servers and other virtual machines that host a variety of software applications. Virtual servers can be scaled up or down on-the-fly based on demand, among other factors, to allow for infrastructure flexibility, faster deployment of applications and data, cost control, and adaptability. Cloud computing systems can use these virtualized computer systems to provide flexible computing resources to end users. Cloud computing systems allow for users spread over a variety of geographic locations to access resources of these virtualized computer systems, such as databases, applications, web content, or other digital data, services, or content.

Cloud Service Providers (CSPs) such as Amazon, Google, Rackspace, and OpenStack deploy physical hardware such as servers, network infrastructure, and connectivity for the cloud computing systems to host digital products and services from various remote locations. Cloud service customers can employ the resources provided by the various CSPs without having to purchase and maintain physical equipment.

Access to cloud resources of the various CSPs is managed through permissions. These permissions could include usernames and passwords, as well as other credentialing information. However, in cloud computing environments, access control beyond initial user authorization is limited. The current access control systems lack the ability to manage access to resources accessed by virtual machines.

OVERVIEW

To provide enhanced operation of computing systems to control access to audit logging resources by virtual machines, various systems, apparatuses, methods, and software are provided herein. In a first example, a method of operating a computing system is provided. The method includes receiving requests for audit credentials from virtual machines, and responsively providing individualized audit credentials to the virtual machines based at least on identities of the virtual machines. The method also includes, in the audit system, authorizing storage of audit data transferred by the virtual machines based at least on the individualized audit credentials accompanying the audit data. The method also includes, in the authorization system, selectively de-authorizing one or more of the virtual machines and reporting information regarding the de-authorized one or more of the virtual machines to the one or more audit systems.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

The various figures and descriptions included herein discuss many examples for enhanced access control for virtual machines in a computing environment. The access control can include restricting access by virtual machines to various data resources, such as databases, other virtual machines, application storage, user data, among other data resources. The access control can allow for individualized authentication or authorization of virtual machines to various data resources, even when the virtual machines are instantiated or replicated from the same virtual images. Although these virtual machines can be hosted in a cloud computing environment, the examples herein are not limited to cloud systems.

Figure 1:
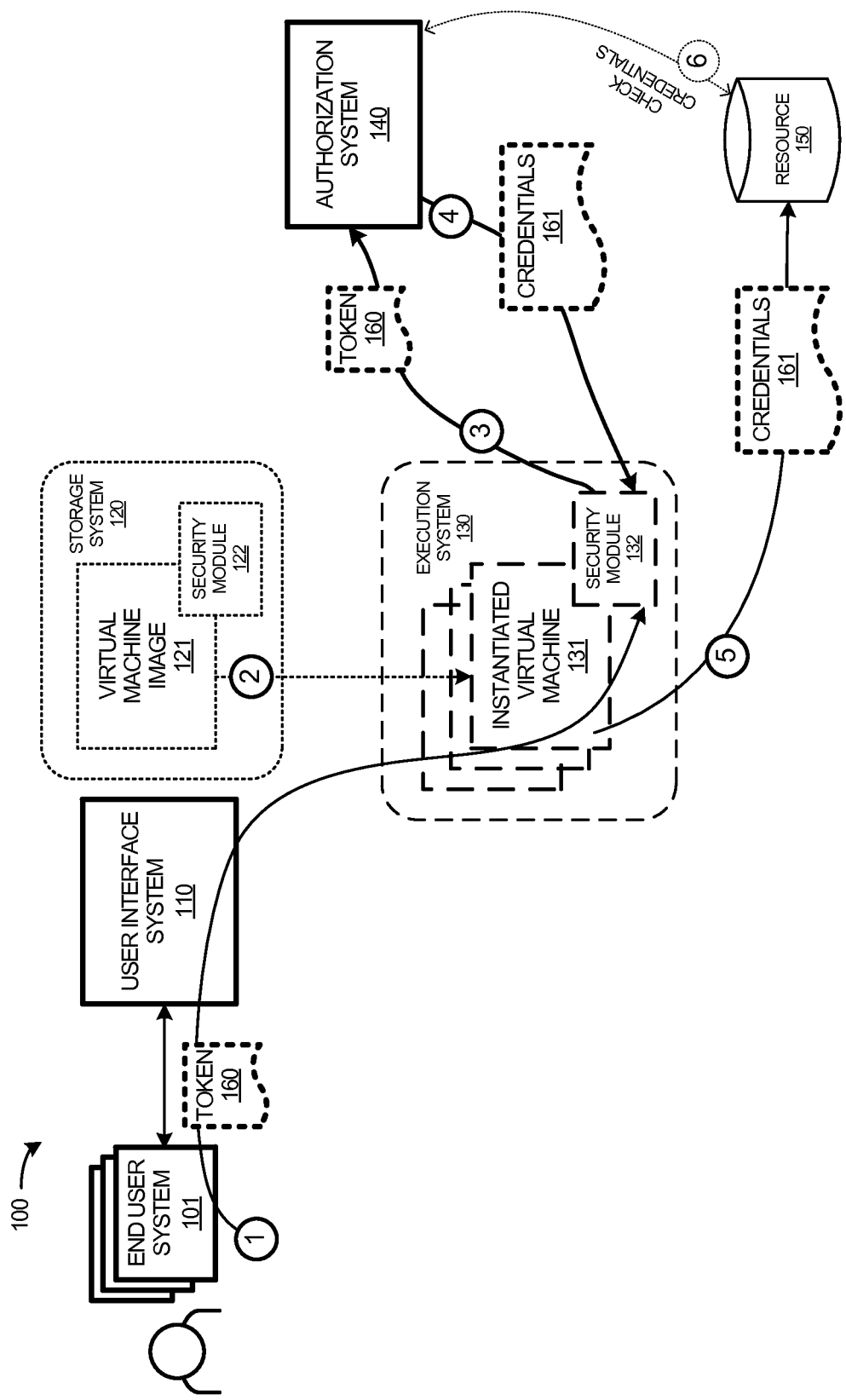
FIG. 1 is a system diagram illustrating a computing environment.

As a first example of a computing system, FIG. 1 is provided. FIG. 1 is a system diagram illustrating computing system 100. Computing system 100 includes end user system 101, user interface system 110, storage system 120, execution system 130, authorization system 140, and data resource 150. The various elements of FIG. 1 are each configured to communicate over one or more data networks, such as over various packet links. Although physical network links are not shown in FIG. 1 for clarity, it should be understood that one or more network links can be included between each element of FIG. 1. For example, end user system 101 and user interface system 110 can communicate over one or more packet networks, which can include the Internet. Various physical computing infrastructure can host user interface system 110, storage system 120, execution system 130, such as a distributed computing system. Likewise, computer systems, such as computer servers and the like, can comprise authorization system 140 as well as data resource 150.

In operation, end user system 101 can interact with user interface system 110 to establish, instantiate, configure, and alter various virtual machines and associated properties. User interface system 110 can include a front-end interface provided over a web interface and accessed in a browser application on end user system 101. In other examples, an application programming interface (API) system is employed for end user system 101 to interface with user interface system 110 to control the operations of virtual machines.

Storage system 120 includes one or more virtual machine images, such as virtual machine image 121. These virtual machine images include operating systems, user and system applications, various modules, network service applications, among other computing resources that can be instantiated and subsequently operate similar to a physical computing system. When activity of an end user or other management service causes a virtual machine to be active, the virtual machine is instantiated by execution system 130. Any number of virtual machines can be concurrently active in execution system 130, which can include any number of virtual machine handling software elements, such as hypervisors, resource managers, virtual network elements, among other software elements. These various active virtual machines can be instantiated from a shared or same virtual image, with many replicated copies of the same virtual machine image being executed concurrently by execution system 130.

In FIG. 1, virtual machine image 121 is instantiated as virtual machine 131. Instantiated virtual machine 131 can then execute various applications, manage computing resources, distribute data to end users, among other activities that a computing system typically performs. However, in FIG. 1, virtual machine image 121 also includes security module 122. Security module 122 is included in the data which forms the image of virtual machine image 121, and can comprise a startup script, executable module, user application, among other modules. Once virtual machine image 121 has been instantiated as virtual machine 131, security module 132 is executed by virtual machine 131. This execution can be automatic upon boot-up of various operating system components of virtual machine 131, or can be responsive to virtual machine 131 seeking out an external data resource, such as resource 150, among other execution triggers. Token 160 is used by virtual machine 131 to establish credentials for virtual machine 131 to access external resources, such as resource 150.

Figure 2:
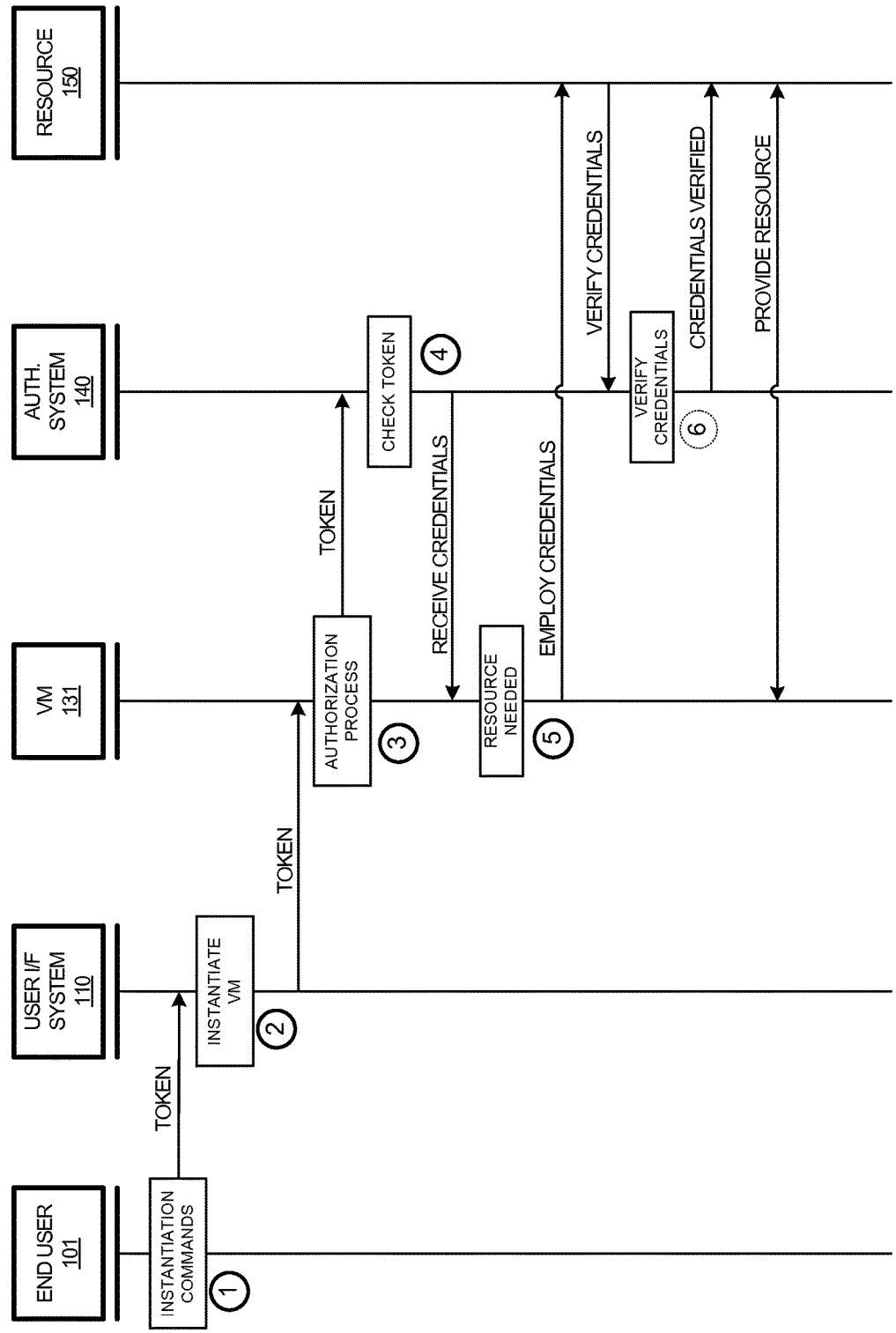
FIG. 2 is a sequence diagram illustrating a method of operation of a computing environment.

FIG. 2 is provided to further illustrate the operations of FIG. 1. FIG. 2 is a sequence diagram illustrating a method of operation of FIG. 1. In FIG. 2, end user system 101 provides token 160 for instantiated virtual machine 131. Token 160 can be provided through user interface system 110 by end user system 101, such as through a web interface, control console, API, or other interface system. Token 160 can be provided with instantiation commands issued by end user system 101, such as commands to instantiate virtual machine image 121. In other examples, token 160 can be provided after instantiation of virtual machine 131. In further examples, end user system 101 requests token 160 from authorization system 140 prior to instantiating virtual machine 131, and the access token is provided by authorization system 140 to end user system 101. Operation '1' of FIG. 1 illustrates an example initial token distribution by end user system 101, and operation '2' of FIG. 2 illustrates instantiation of virtual machine image 121 into virtual machine 131.

Token 160 can comprise a datagram unique to virtual machine 131, such an encrypted code, security key, identifier, identity of end user system 101, or other data, including combinations and variations thereof. In some examples, token 160 comprises pseudo-random data, such as an encrypted key, used to uniquely identify a particular instance of virtual machine image 121. Token 160 can be generated or identified by end user system 101, or can be provided to end user system 101 by authorization system 140. Token 160 can comprise an identity of end user system 101 or a user of end user system 101. The identity can allow for auditing of which users or end user systems desire to access particular resources, such as in healthcare auditing to establish traceability between data access and users. In other examples, token 160 comprises a unique code or encrypted key, and can be used for access control or access restriction to prevent unauthorized users from gaining access to data resources. Other configurations of token 160 are possible, including combinations thereof. Token 160 typically comprises one or more packets which can include network addressing information that identifies virtual machine 131 or security module 132.

Token 160 can be provided to virtual machine 131 during instantiation, such as through user data or user parameters that are provided as an input to virtual machine image 121 during an instantiation process. Security module 132 is configured to receive token 160 responsive to execution of security module 132. For example, security module 132 can comprise a startup script which uses token 160 as input data or user parameters provided during instantiation of virtual machine 131. Security module 132 transfers token 160 for delivery to authorization system 140.

Responsive to receiving token 160, authorization system 140 transfers credentials 161, as shown by operations '3' and '4' in FIG. 1. Authorization system 140 provides credentials 161 for delivery to security module 132 or virtual machine 131. These credentials are used by virtual machine 131 to access a data resource, such as resource 150. Credentials 161 can comprise user credentials, such as a username, password, access code, PIN number, among other credentials, including combinations thereof. Credentials 161 can be specific to token 160, specific to virtual machine 131, or specific to a user of end user system 101. The issued credentials may be temporary or one-time use.

During execution of virtual machine 131, access to a data resource might be desired. This data resource, such as resource 150, can be external to virtual machine 131 and require credentials in order to access the associated data resources. For example, resource 150 can comprise a database system and virtual machine 131 desires to access data stored or handled by that database system. Any data resource can be employed, such as user applications, databases, digital media content resources, healthcare data, government data, or other data resources, including combinations thereof.

To access resource 150, virtual machine 131 provides credentials 161 to resource 150, as shown by operation '5' in FIG. 1. Resource 150 might optionally check or verify credentials 161 before providing any associated data to virtual machine 131, such as in operation '6' in FIG. 1. For example, resource 150 can verity credentials 161 with authorization system 140. If the credentials are verified, then data associated with resource 150 can be transferred for delivery to virtual machine 131. Credentials 161 are not necessarily verified with authorization system 140 in all examples, such as when resource 150 can verify credentials 161 locally or when resource 150 initially provided credentials 161 to authorization system 140. In yet further examples, responsive to receiving token 160, authorization system 140 can identify the credentials and transfer the credentials for delivery to data resource 150 and for delivery to the virtual machine 131.

If credentials 161 are not valid or fail associated verifications, then resource 150 can deny access to virtual machine 131 for further access to resource 150. However, if virtual machine 131 is verified using credentials 161, then further access to resource 150 is provided. Resource 150 and virtual machine 131 can establish a communication session which is authenticated by credentials 161, and virtual machine 131 can continue to have access to resource 150 during the communication session.

As discussed above for FIGS. 1 and 2, individualized access credentials can be provided to a virtual machine. The virtual machine can be based upon a virtual machine image which can be used to establish many instances of the same virtual machine image. Thus, a shared virtual machine image can be used to spawn or replicate many identical virtual machines. Additionally, a particular instance of a first virtual machine might replicate itself during execution of the first virtual machine. However, it can be difficult to allow individualized access control for each identical or replicated virtual machine without changing the original image data for each instance of a virtual machine. In the examples herein, a token or other data is provided as user data or user parameters which are employed by a security module during instantiation of a virtual machine. This token can be unique to a virtual machine or unique to a user employing a virtual machine, and thus provides individualized access control for a virtual machine that is instantiated from the same virtual machine image as many other virtual machines. A security module included in a virtual machine image, such as a startup script, can receive a token provided by a user or other executing entity which can be used to establish credentials that are unique to that particular instance of a virtual machine. Authorization system 140 provides credentials responsive to receiving a token from a virtual machine, and that virtual machine can then receive individualized credentials for access control to various data resources. In this manner, the same virtual machine image can be employed across many replications and instances which still allowing for individualized identification, access control, and auditing of each virtual machine independently of each other without having to pre-customize each virtual machine image to be different from each other.

In further examples, when a virtual machine is instantiated from a shared virtual machine image 121, a second virtual machine can be instantiated from shared virtual machine image 121. This second virtual machine can be instantiated responsive to end user commands or end user activity, such as in end user system 101 or a second end user system different than end user system 101. The second end user system can provide a second access token during instantiation of the second virtual machine which can be employed by a security module of the second virtual machine. The second access token is different than first access token 160. Responsive to the second instantiation command, the second virtual machine identified by the second instantiation command uses the second access token as second user data for the second virtual machine during instantiation. In the second virtual machine, a security module is executed responsive to instantiation that transfers the second access token for delivery to authorization system 140. In the second virtual machine, second credentials are received responsive to the second access token, and data resource 150 is accessed using the second credentials. The second credentials are different than first credentials 161. In yet further examples, instead of the second virtual machine being instantiated due to an instantiation command, the first virtual machine 131 might decide to replicate due to loading or other conditions, using the same shared virtual machine image 121. The second access token can be provided by an end user system during replication.

Returning to the elements of FIG. 1, end user system 101 comprises one or more computing devices, such as a computer, tablet computer, smartphone, gaming console, kiosk computer, or other computing device, including combinations thereof. End user system 101 can be operated by a user, such as when a user interacts with an application provided by end user system 101. For example, user interface system 110 could provide access to an e-commerce web site hosted on virtual machine 131, and end user system 101 can include a customer accessing the web site in a browser application to make purchases. In another example, user interface system 110 can provide a healthcare application hosted on virtual machine 131, and end user system 101 can comprise a customer signing up for healthcare insurance of the healthcare provider. In yet another example, user interface system 110 can provide a financial application, such as a banking web site, online stock trading website, or 401(k) and Retirement Administration services web site hosted on virtual machine 131. End user system is operated by a customer of the bank, online stock trading service, or 401(k) company.

User interface system 110 comprises user interface elements and computing systems configured to provide virtual machine control and interfacing to end users. In some examples, end users are not aware of using virtual machines and user interface system 110 presents user interfaces to end users which employ virtual machines responsive to end user activity. In other examples, user interface system 110 provides administration consoles or management interfaces for end users to control and alter the operations of virtual machines, create and maintain virtual machine images, manage security modules of virtual machine images, among other operations. In yet further examples, user interface system 110 comprises one or more servers for presenting web pages or user applications to end users. Responsive to end user activity, such as web browsing activities or application selections, one or more virtual machines can be instantiated to scale up load handling capabilities of the associated web pages or user applications. User interface system 110 is configured to receive tokens from end users and pass these tokens to virtual machines during instantiation.

User interface system 110 can be provided along with storage system 120 and execution system 130 in a cloud computing environment, such as provided by Cloud Service Providers (CSPs) such as Amazon, Google, Rackspace, and OpenStack, among others. The cloud computing environment can include a distributed computing environment with one or more physical servers distributed over one or more geographic areas. A plurality of virtual machines can be instantiated from a single shared virtual machine image responsive to user demand, load conditions, throughput needs, among other factors. For example, system load or access requests may increase due to end user demand. For instance, virtual machine 131 may be hosting an e-commerce or healthcare web site. At certain times there may be bursts of spikes in end-user requests. For example, in an e-commerce web site, there may be increased activity when a new product is launched or during sales, like Black Friday or Cyber Monday. On a healthcare web site there may be spikes or bursts of end-user activity when there is a deadline to sign up for coverage or new plans are instituted. In order to accommodate the increased number of requests, virtual machine 131 may be programmed to replicate or spawn to increase bandwidth to the application service. In other examples, an administrator or other personnel may send a request to replicate or spawn virtual machine 131. Different tokens can be provide to each instance or replication of a virtual machine to allow that virtual machine to retrieve credentials from authorization system 140.

Figure 5:
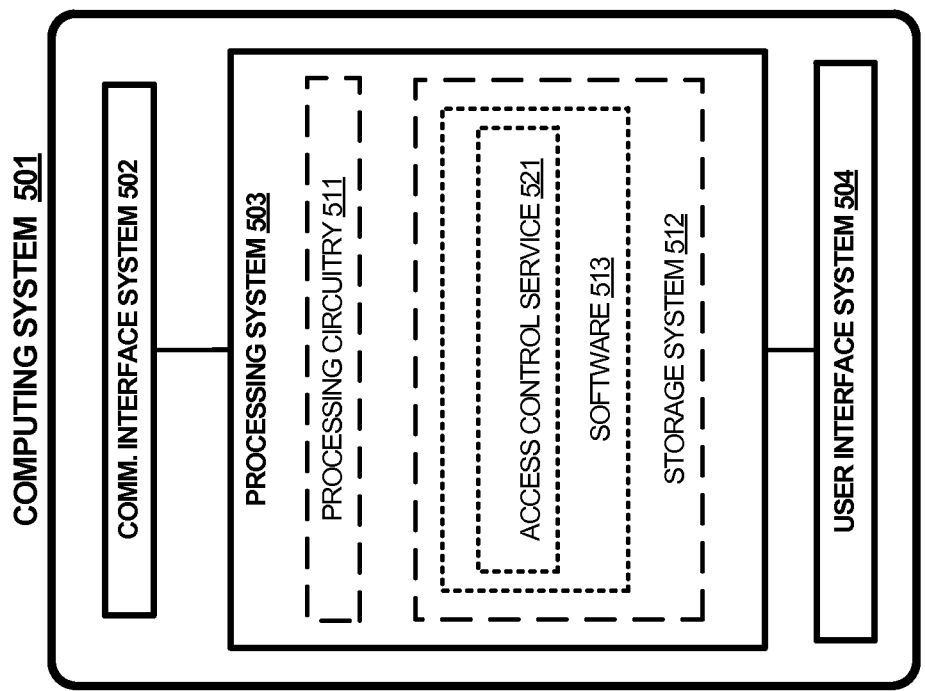
FIG. 5 is a block diagram illustrating an example computing system.

Cloud computing environments that provide user interface system 110, storage system 120, and execution system 130, are representative of any physical or virtual computing system, device, or collection thereof capable of hosting all or a portion of services provided to end users. Examples of cloud computing environment include, but are not limited to, server computers, web servers, application servers, rack servers, blade servers, virtual machine servers, or tower servers, as well as any other type of computing system, of which computing system 501 illustrated in FIG. 5 is representative.

Storage system 120 includes one or more non-transitory computer-readable storage media, such as disk drives, disk arrays, solid state storage drives, optical drives, magnetic storage systems, among other storage media. Storage system 120 stores one or more virtual machine images which can be instantiated by execution system 130. Storage system 120 can also store user data, application data, resource data, among other data, including combinations thereof.

Execution system 130 includes one or more processing systems that execute software instructions responsive to user activity and commands issued by user interface system, among other systems. These processing systems can be localized or distributed, and include or more processors, microprocessors, processing circuitry, cloud-based systems, or some other processing devices or software systems, and can be distributed among multiple processing devices. Examples of execution system 130 can also include software such as an operating system, logs, data structures, databases, utilities, drivers, networking software, and other software stored on a non-transitory computer-readable medium. Execution system 130 also includes one or more network interfaces for exchanging network communications over one or more communication links.

Although not shown in FIG. 1 for clarity, computing system 100 can include network routing elements and network traffic handling elements. These network routing and handling elements can include wired or wireless network elements, such as packet networks and packet links that can each use metal, glass, optical, air, space, or some other material as the transport media. The network routing and handling elements can each use various communication protocols, such as Internet Protocol (IP), Ethernet, Time Division Multiplex (TDM), asynchronous transfer mode (ATM), synchronous optical networking (SONET), hybrid fiber-coax (HFC), Universal Serial Bus (USB), circuit-switched, communication signaling, wireless communications, or some other communication format, including combinations, improvements, or variations thereof. These network routing and handling elements can include direct links or can include intermediate networks, systems, or devices, and can include logical network links transported over multiple physical links. These network routing and handling elements can each include many different signals sharing the same associated link comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Virtual machine 131, along with any other instantiated or replicated virtual machines, can provide an application service to end users. This application service can be representative of any application, software application, module, component, or collection thereof hosted in computing system 100. Examples of an application service include, but are not limited to, healthcare applications, financial application, banking applications, credit card payment applications, electronic payment applications, email applications, gaming applications, real-time communication applications, blogging and micro-blogging applications, social networking applications, and e-commerce applications, as well as any other type of application. Application services may be locally installed and executed applications, streamed applications, mobile applications, or any combination or variation thereof. In some implementations, the application services may be a browser-based application that executes in the context of a browser application.

Authorization system 140 comprises computer processing systems and equipment. Authorization system 140 can include communication or network interfaces, as well as computer systems, microprocessors, circuitry, cloud-based systems, or some other processing devices or software systems, and can be distributed among multiple processing devices. Examples of authorization system 140 can also include software such as an operating system, logs, databases, utilities, drivers, networking software, and other software stored on a computer-readable medium.

Resource 150 includes computers, physical servers, virtual machines, virtual servers, applications, shared data resources, and shared databases. Resource 150 can be representative of any physical or virtual computing systems, devices, or collections thereof capable of providing digital data resources to a virtual machine.

Figure 3:
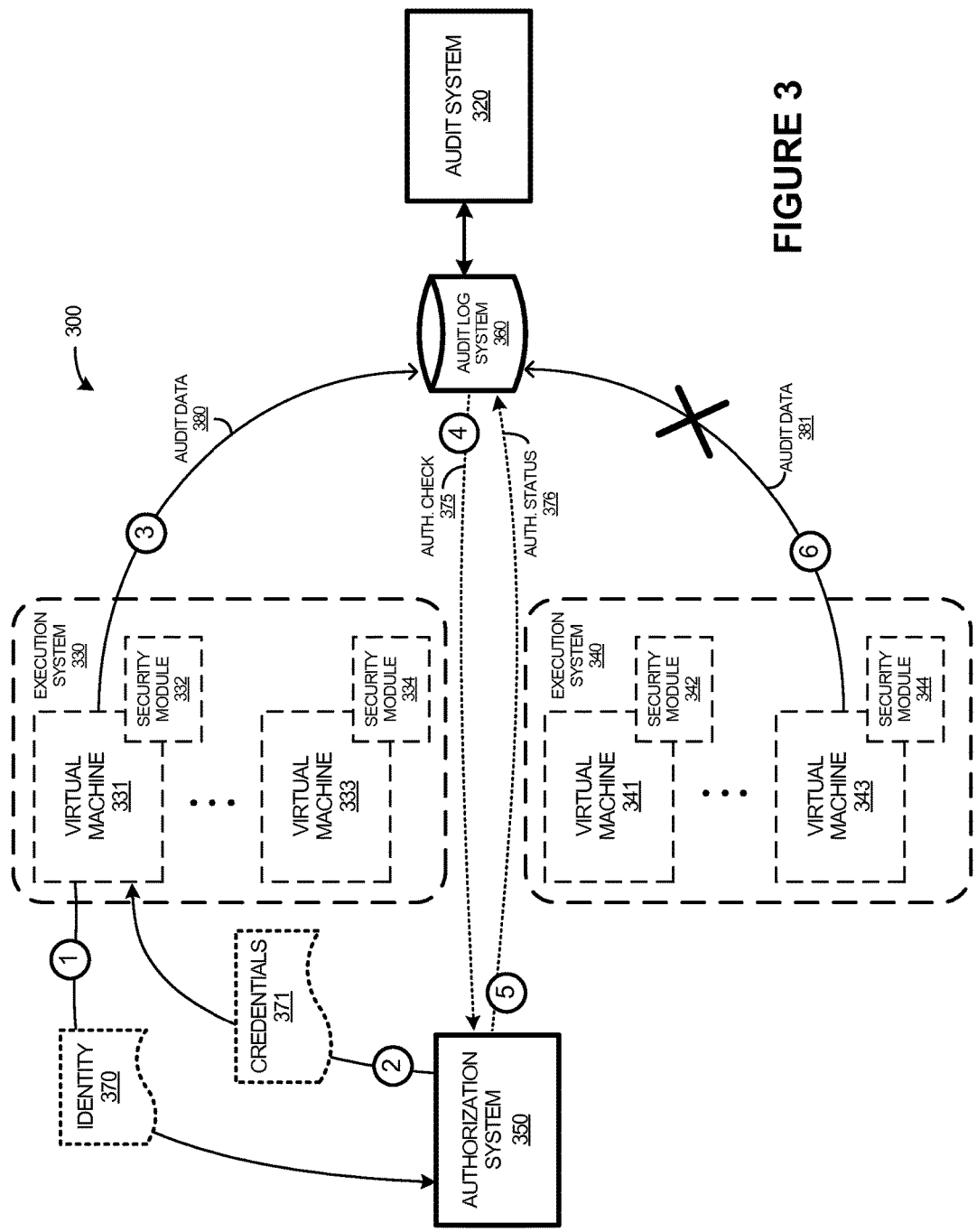
FIG. 3 is a system diagram illustrating a computing environment.

FIG. 3 is presented to illustrate a computing environment where individualized access to audit logging resources is established for virtual machines. FIG. 3 is a system diagram illustrating computing system 300. Computing system 300 includes execution system 330, execution system 340, authorization system 350, audit log system 360, and audit system 320. The various elements of FIG. 3 are each configured to communicate over one or more data networks, such as over various packet links. Although physical network links are not shown in FIG. 3 for clarity, it should be understood that one or more network links can be included between each element of FIG. 3. For example, execution system 330 and audit log system 360 can communicate over one or more packet networks, which can include the Internet. Various physical computing infrastructure can host execution system 330 and execution system 340, such as a distributed or cloud computing system. Likewise, computer systems, such as computer servers and the like, can comprise authorization system 340, audit log system 360, and audit system 320.

In operation, one or more virtual machines are executed by an associated execution system. These virtual machines can deploy application servers, databases, media servers, or any other data handling, processing, or distribution system. In some examples, each of execution systems 330 and 340 are provided by different cloud computing platforms, such as different CSPs. For example, virtual machines 331 and 333 are executed on execution system 330, while virtual machines 341 and 343 are executed on execution system 340, although other configurations are possible.

During normal operation of each virtual machine in FIG. 3, logging of the various functions and operations of each virtual machine can be tracked. This logging can include audit logging to maintain a record for audit purposes, such as for later review by audit system 320, among other systems. The logging can include information related to user access, network sessions, timestamps of activities, virtual machine startup/instantiation, replication times of virtual machines, load conditions, network activity, processor event logging, operating system event logging, among any other logging functions. In the example shown in FIG. 3, this logging is provided by audit log system 360. Each virtual machine is configured to transfer log information for delivery and storage by audit log system 360. However, when each virtual machine is replicated or instantiated from a shared or the same virtual machine image, then differentiating which log entries should be associated with each virtual machine can be difficult. Although a shared login or credential can be used by all virtual machines instantiated from a shared virtual machine image, this shared login can lead to problems with tracking individual virtual machines as well as controlling access to an audit log on an individualized basis.

Figure 4:
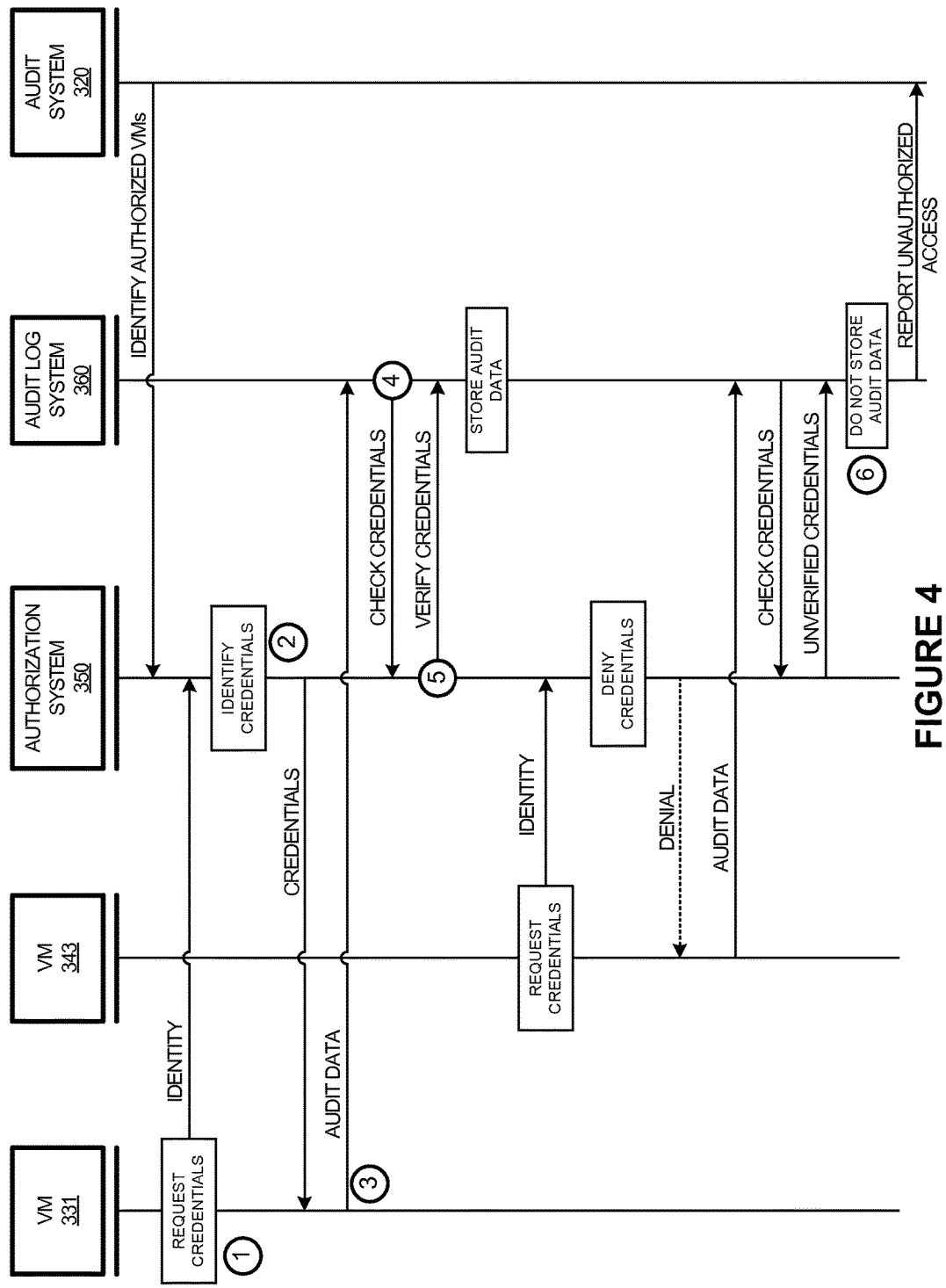
FIG. 4 is a sequence diagram illustrating a method of operation of a computing environment.

FIG. 4 is presented to illustrate individualized credentialing for accessing audit log resources associated with virtual machines. FIG. 4 is a sequence diagram illustrating a method of operation of elements of system 300. In FIG. 4, virtual machine 331, after instantiation, is configured to request credentials for logging purposes. In FIG. 3, each virtual machine includes an associated security module, such as security module 332 of virtual machine 331. This security module can include a script or executable code which is configured to request audit credentials from authorization system 350.

In FIGS. 3 and 4, virtual machine 331 provides at least an identity of virtual machine 331 for delivery to authorization system, as noted by operation '1' in FIG. 3. This identity can include a unique identifier generate by security module 332 to identify virtual machine 331 during the time that virtual machine 331 is active or instantiated. The unique identifier can be a pseudo-random number. In other examples, the identity can instead be a network address, such as an IP address or MAC address of virtual machine 331. In other examples, further identity information is provided to authorization system 350, such as a token as described in FIG. 1. This token can be provided by a user or end user system as user data or user parameters for use in receiving audit credentials during an instantiation process of virtual machine 331 or a startup scripting process of security module 332.

Responsive to the identity information, authorization system 350 can verify the virtual machine and authorize the virtual machine to receive audit credentials for use in storing audit log information in audit log system 360. These credentials, namely credentials 371, are then transferred for delivery to the virtual machine that requested them, such as virtual machine 331. In some cases, authorization system 350 might deny authorization to a virtual machine for audit credentials, such as due to an invalid identity. Operation '2' in FIG. 3 indicates the transfer of credentials 371. Credentials 371 can comprise user credentials, such as a username, password, access code, PIN number, among other credentials, including combinations thereof. Credentials 371 are specific to an identity provided or specific to virtual machine 331. The issued credentials may be temporary or one-time use.

Once credentials 371 are received by virtual machine 331, these credentials can accompany audit data 380 for logging by audit log system 360. Audit log system 360 can selectively allow or deny storage of audit data based on credentials provided by virtual machines. Instead of a using a shared or the same credentials for all virtual machines instantiated from the same virtual machine image, audit log system 360 uses individualized credentialing for each instance of a virtual machine. For example, virtual machines 331 and 333 can be duplicate virtual machines or instantiated from the same source virtual machine image. However, each virtual machine 331 and 333 requests separate credentials from authorization system 350, and authorization system 350 provides individualized credentials for each virtual machine based in part on the identity provided by the associated virtual machine. Audit data 380 is shown being transferred in operation '3' of FIG. 3, and can be accompanied by the associated credentials. It should be understood that the credentials can precede or follow any associated audit data, and in some examples, a communication session can be established between a virtual machine and audit log system 360 using the credentials. Once the communication session is established, then any audit data might be authorized for storage based on a handshaking process using the credentials.

In some examples, the credentials are verified internally to audit log system 360, such as when the credentials are also transferred by authorization system 350 for delivery to audit log system 360 when transferred to the associated virtual machine. In other examples, audit log system 360 generates the credentials and provides the credentials to authorization system 350, and thus the credentials can also be checked or verified locally to audit log system 360. However, as shown in FIGS. 3 and 4, audit log system 360 instead verifies the credentials associated with audit data 380 using authorization system 350. In operation '4' of FIG. 3, audit log system 360 transfers a verification message or authentication check 375 for delivery to authorization system 350. Authorization system 350 can verify or deny the credentials accordingly, and respond with an authorization status message 376 that indicates at least if the credentials are verified or denied. Audit log system 360 can store audit data 380 if the credentials are verified.

In another example, as shown in FIG. 4, virtual machine 343 requests credentials using at least an identity. However, in this example, authorization system 350 denies authorization for virtual machine 343. This denial can arise from an incorrect or invalid identity, a property of audit log system 360, such as a time of day, day of the week, or such, that virtual machine 343 is allowed access to store audit data, or can arise from detection of malicious or malfunctioning behavior of virtual machine 343. In further examples, virtual machine 343 might not include a security module and not request credentials from authorization system 350. If virtual machine 343 nonetheless attempts to store audit data 381 in audit log system 360, then audit log system 360 can deny storage of audit data 381 based on a lack of credentials or due to credentials provided with audit data 381 being invalid or denied. Audit log system 360 can verify any credentials associated with audit data 381, and responsive to unverified or denied credentials can without storing audit data 381. In further examples, responsive to failed verification using improper or invalid credentials, audit data log 360 can report the failed credentials to authorization system 350 or to audit system 320. This report can include information related to unauthorized access to store data in audit log system 360.

In further examples, once credentials have been granted for a particular virtual machine, such as for virtual machine 331, these credentials can be revoked at a later time. When audit log system 360 checks or verifies associated credentials with authorization system 350, a previously authorized virtual machine can be denied access. Additionally, authorization system 350 can monitor an activity status of virtual machines. When a particular virtual machine that previously was granted credentials becomes inactive or de-instantiated, then the credentials for that virtual machine can be invalidated by authorization system 350. The invalid status can be proactively reported to audit log system 360 or can be provided responsive to further audit data storage attempts using the credentials. This invalidation of credentials for a particular virtual machine can provide a more secure operating environment since another virtual machine cannot use the credentials of a first virtual machine, such as when a second virtual machine is replicated from the first virtual machine.

Returning to the elements of FIG. 3, execution systems 330 and 340 can each be included in separate cloud computing systems, such as provided by different CSPs. The cloud computing environment can include a distributed computing environment with one or more physical servers distributed over one or more geographic areas. A plurality of virtual machines can be instantiated from a single shared virtual machine image responsive to user demand, load conditions, throughput needs, among other factors. For example, system load or access requests may increase due to end user demand. For instance, any of virtual machines 331, 333, 341, and 343 may be hosting an e-commerce or healthcare web site. At certain times there may be bursts of spikes in end-user requests. For example, in an e-commerce web site, there may be increased activity and there may be spikes or bursts of end-user activity. In order to accommodate the increased number of requests, a virtual machine may be programmed to replicate or spawn to increase bandwidth to the application service. In other examples, an administrator or other personnel may send a request to replicate or spawn a virtual machine. Different identities can be provided by each instance or replication of a virtual machine to allow that virtual machine to retrieve audit credentials from authorization system 350.

Cloud computing environments that provide execution systems 330 and 340 are representative of any physical or virtual computing system, device, or collection thereof capable of hosting all or a portion of services provided to end users. Examples of cloud computing environment include, but are not limited to, server computers, web servers, application servers, rack servers, blade servers, virtual machine servers, or tower servers, as well as any other type of computing system, of which computing system 501 illustrated in FIG. 5 is representative.

Although not shown in FIG. 3 for clarity, computing system 300 can include network routing elements and network traffic handling elements. These network routing and handling elements can include wired or wireless network elements, such as packet networks and packet links that can each use metal, glass, optical, air, space, or some other material as the transport media. The network routing and handling elements can each use various communication protocols, such as Internet Protocol (IP), Ethernet, Time Division Multiplex (TDM), asynchronous transfer mode (ATM), synchronous optical networking (SONET), hybrid fiber-coax (HFC), Universal Serial Bus (USB), circuit-switched, communication signaling, wireless communications, or some other communication format, including combinations, improvements, or variations thereof. These network routing and handling elements can include direct links or can include intermediate networks, systems, or devices, and can include logical network links transported over multiple physical links. These network routing and handling elements can each include many different signals sharing the same associated link comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Virtual machines 331, 333, 341, and 343, along with any other instantiated or replicated virtual machines, can provide an application service to end users. This application service can be representative of any application, software application, module, component, or collection thereof hosted in computing system 300. Examples of an application service include, but are not limited to, healthcare applications, financial application, banking applications, credit card payment applications, electronic payment applications, email applications, gaming applications, real-time communication applications, blogging and micro-blogging applications, social networking applications, and e-commerce applications, as well as any other type of application. Application services may be locally installed and executed applications, streamed applications, mobile applications, or any combination or variation thereof. In some implementations, the application services may be a browser-based application that executes in the context of a browser application.

Authorization system 350 comprises computer processing systems and equipment. Authorization system 350 can include communication or network interfaces, as well as computer systems, microprocessors, circuitry, cloud-based systems, or some other processing devices or software systems, and can be distributed among multiple processing devices. Examples of authorization system 350 can also include software such as an operating system, logs, databases, utilities, drivers, networking software, and other software stored on a computer-readable medium.

Audit log system 360 includes computers, physical servers, virtual machines, virtual servers, applications, shared data resources, and shared databases. Audit log system 360 can be representative of any physical or virtual computing systems, devices, or collections thereof capable of providing digital data resources to a virtual machine.

Audit system 320 comprises computer processing systems and equipment. Audit system 320 can include communication or network interfaces, as well as computer systems, microprocessors, circuitry, cloud-based systems, or some other processing devices or software systems, and can be distributed among multiple processing devices. Examples of audit system 320 can also include software such as an operating system, logs, databases, utilities, drivers, networking software, and other software stored on a computer-readable medium.

FIG. 5 illustrates computing system 501 that is representative of any apparatus, system, or collections thereof suitable for implementing an access control service, access control node, a cloud computing resource, user terminal, or all of the above. Computing 501 is suitable for implementing user interface system 110, storage system 120, execution system 130, authorization system 140, or resource 150 of FIG. 1, although these could use alternative configurations. Computing 501 is also suitable for implementing execution system 330, execution system 340, authorization system 350, audit log system 360, or audit system 320 of FIG. 3, although these could use alternative configurations.

Examples of computing system 501 include server computers, rack servers, web servers, cloud computing platforms, and data center equipment, as well as any other type of physical or virtual server machine, and any variation or combination thereof. In some implementations, a collection of multiple computing systems may be employed to implement all or portions of access control service 521, which may be hosted in one or more data centers, virtual data centers, or any other suitable computing facilities.

Computing system 501 may be implemented as a single apparatus, system, or device or may be implemented in a distributed manner as multiple apparatuses, systems, or devices. Computing system 501 includes, but is not limited to, communication interface system 502, processing system 503, and user interface 504. In some examples, user interface 504 may be omitted. Processing system 503 is linked to communication interface system 502 and user interface 504. Processing system 503 includes processing circuitry 511 and storage system 512 that stores software 513.

Processing system 503 loads and executes software 513 from storage system 512. When executed by processing system 503 software 513 directs processing system 503 to operate as described herein for the various access control services discussed in the foregoing implementations. Computing system 501 may optionally include additional devices, features, or functionality not discussed for purposes of brevity.

Referring still to FIG. 5, processing system 503 may comprise a microprocessor and other circuitry that retrieves and executes software 513 from storage system 512. Processing system 503 may be implemented within a single processing device, but may also be distributed across multiple processing devices or sub-systems that cooperate in executing program instructions. Examples of processing system 503 include general purpose central processing units, application specific processors, and logic devices, as well as any other type of processing device, combinations, or variations thereof.

Storage system 512 may comprise any non-transitory computer readable storage media readable by processing system 503 and capable of storing software 513. Storage system 512 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media.

In addition to computer readable storage media, in some implementations, storage system 512 may also include computer readable communication media over which software 513 may be communicated internally or externally. Storage system 512 may be implemented as a single storage device but may also be implemented across multiple storage devices or sub-systems co-located or distributed relative to each other. Storage system 512 may comprise additional elements, such as a controller, capable of communicating with processing system 503 or possibly other systems.

Software 513 may be implemented in program instructions and among other functions may, when executed by processing system 503, direct processing system 503 to operate as described herein with respect to the various operational scenarios, sequences, and processes. In particular, the program instructions may include various components or modules that cooperate or otherwise interact to carry out the various processes and operational scenarios described herein. The various components or modules may be embodied in compiled or interpreted instructions or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 513 may include additional processes, programs, or components, such as operating system software or other application software. Software 513 may also comprise firmware or some other form of machine-readable processing instructions executable by processing system 503.

In general, software 513 may, when loaded into processing system 503 and executed, transform a suitable apparatus, system, or device (of which computing system 501 is representative) overall from a general-purpose computing system into a special-purpose computing system customized to facilitate run-time experimentation with user interface configurations as described herein for each implementation. Indeed, encoding software 513 on storage system 512 may transform the physical structure of storage system 512. The specific transformation of the physical structure may depend on various factors in different implementations of this description. Examples of such factors may include, but are not limited to, the technology used to implement the storage media of storage system 512 and whether the computer-storage media are characterized as primary or secondary storage, as well as other factors.

For example, if the computer readable storage media are implemented as semiconductor-based memory, software 513 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

It should be understood that computing system 501 is generally intended to represent a computing system or systems on which software 513 may be deployed and executed in order to implement access control services in a cloud computing environment. However, computing system 501 may also be suitable as any computing system on which software 513 may be staged and from where software 513 may be distributed, transported, downloaded, or otherwise provided to yet another computing system for deployment and execution, or yet additional distribution.

Communication interface system 502 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 501 and any other computing system (not shown) may occur over a communication network or networks and in accordance with various communication protocols, combinations of protocols, or variations thereof. Examples of communication networks over which computing system 501 may exchange information with other computing systems include intranets, the Internet, local area networks, wide area networks, wireless networks, wired networks, virtual networks, software defined networks, data center buses, computing backplanes, networks, or any combination or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof. In some implementations, information may be exchanged in accordance with any of a variety of email protocols, including without limitation POP (Post Office Protocol), IMAP (Internet Message Access Protocol), MAPI (Messaging Application Programming Interface), HTTP mail, or any other suitable email protocol.

User interface system 504 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 504. In some cases, the input and output devices may be combined in a single device, such as a display capable of displaying images and receiving touch gestures. The aforementioned user input and output devices are well known in the art and need not be discussed at length here.

User interface system 504 may also include associated user interface software executable by processing system 503 in support of the various user input and output devices discussed above. Separately or in conjunction with each other and other hardware and software elements, the user interface software and user interface devices may support a graphical user interface, a natural user interface, or any other type of user interface. In addition, user input made with respect to the user interfaces can be input via user interface system 504.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts. It is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of controlling access to audit logging resources by an instantiated virtual machine from among a plurality of instantiated virtual machines in a virtual computing environment, the method comprising:
   the instantiated virtual machine receiving a user token;
   the instantiated virtual machine sending a request for individualized audit credentials from an authorization system, wherein the request is based on the user token and an identity, wherein the identity identifies the instantiated virtual machine; and
   the instantiated virtual machine receiving the individualized audit credentials from the authorization system based at least on the user token and the identity, the individualized audit credentials enabling authorized storage of first audit data in an audit system, wherein the first audit data pertains to the instantiated virtual machine, and the authorized storage is authorized by the audit system;
   the instantiated virtual machine actively operating, with the individualized audit credentials, through a first time period;
   wherein when the instantiated virtual machine experiences, after the first time period, an event selected from failing verification based on the identity or having the individualized audit credentials revoked, the event is effective to cause de-authorization of the instantiated virtual machine and reporting of information regarding the de-authorized instantiated virtual machine to the audit system, and wherein the de-authorization of the instantiated virtual machine comprises determining when the instantiated virtual machine has been de-instantiated, and responsively allowing for de-authorization of the individualized audit credentials of the de-authorized de-instantiated instantiated virtual machine.

2. The method of claim 1, wherein the identity comprises a unique number generated by the instantiated virtual machine.

3. The method of claim 1, wherein the identity comprises a network address of the instantiated virtual machine.

4. The method of claim 1, wherein the user token is received by the instantiated virtual machine during instantiation of the instantiated virtual machine.

5. The method of claim 1, wherein the authorized storage is enabled responsive to the audit system verifying the individualized audit credentials with the authorization system and responsively receiving an authorization status transferred by the authorization system.

6. The method of claim 1, wherein the information regarding the de-authorized instantiated virtual machine comprises the individualized audit credentials of the de-authorized instantiated virtual machine.

7. The method of claim 1, wherein the storage of the first audit data is based at least on the individualized audit credentials accompanying the first audit data.

8. The method of claim 7, wherein the instantiated virtual machine is authorized to store the first audit data based on the authorization system receiving authorization check messages transferred by the audit system and responsively providing the audit system with authorization status messages indicating that the instantiated virtual machine is authorized to store the first audit data.

9. A computing system configured to control access to audit logging resources by virtual machines, the computing system comprising software instructions stored on at least one non-transitory computer-readable storage medium, wherein the software instructions are configured, when executed by one or more processors, to enable the computing system to:
receive a request from an instantiated virtual machine from among a plurality of instantiated virtual machines for audit credentials, wherein the request is based on at least a user token and an identity from the instantiated virtual machine;
provide, in response to the request, individualized audit credentials to the instantiated virtual machine based at least on the user token and the identity;
authorize storage of audit data transferred by the instantiated virtual machine over a first period of time based at least on the individualized audit credentials; and
de-authorize the instantiated virtual machine, after the first period of time, and report information regarding de-authorization of the instantiated virtual machine, responsive to at least one of the following:
failed verification of the instantiated virtual machine based on the identity, or
revocation of the individualized audit credentials; and
wherein the de-authorization of the instantiated virtual machine comprises determining when the instantiated virtual machine has been de-instantiated, and responsively allowing for de-authorization of the individualized audit credentials of the de-authorized de-instantiated instantiated virtual machine.

10. The computing system of claim 9, wherein the identity comprises a unique number generated by the instantiated virtual machine.

11. The computing system of claim 9, wherein the identity comprises a network address of the instantiated virtual machine.

12. The computing system of claim 9, wherein the identity comprises an access token provided to the instantiated virtual machine during instantiation of the instantiated virtual machine.

13. The computing system of claim 9, wherein the software instructions are configured, when executed by one or more processors, to enable the computing system to:
authorize storage of the audit data transferred by the instantiated virtual machine by at least checking the individualized audit credentials with an authorization system and responsively receiving an authorization status transferred by the authorization system.

14. The computing system of claim 9, wherein the software instructions are configured, when executed by one or more processors, to enable the computing system to:
de-authorize the instantiated virtual machine by at least determining when the instantiated virtual machine has been de-instantiated, and responsively de-authorizing the individualized audit credentials of the de-authorized instantiated virtual machine.

15. The computing system of claim 9, wherein the information regarding the de-authorized instantiated virtual machine comprises the individualized audit credentials of the de-authorized instantiated virtual machine.

16. The computing system of claim 9, wherein the software instructions are configured, when executed by one or more processors, to enable the computing system to:
store the audit data transferred by the instantiated virtual machine based at least on the individualized audit credentials accompanying the audit data.

17. The computing system of claim 16, wherein the software instructions are configured, when executed by one or more processors, to enable the computing system to:
receive authorization check messages transferred by an audit system and responsively provide authorization status messages for delivery to the audit system indicating whether the instantiated virtual machine is authorized to store the audit data.

18. A computer-implemented method for controlling access to audit logging resources by a plurality of virtual machines, the method comprising:
receiving a request from an instantiated virtual machine for audit credentials, wherein the request is based on at least a user token and an identity received from the instantiated virtual machine;
providing, in response to the request, individualized audit credentials to the instantiated virtual machine based at least on the user token and the identity;
authorizing storage of audit data, in an audit system, transferred by the instantiated virtual machine based at least on the individualized audit credentials; and
de-authorizing the instantiated virtual machine and reporting information regarding de-authorization of the instantiated virtual machine, responsive to at least one of the following:
failed verification of the instantiated virtual machine based on the identity, or
revocation of the individualized audit credentials; and
wherein the de-authorization of the instantiated virtual machine comprises determining when the instantiated virtual machine has been de-instantiated, and responsively allowing for de-authorization of the individualized audit credentials of the de-authorized de-instantiated instantiated virtual machine.

19. The computer-implemented method of claim 18, wherein the user token is provided to the instantiated virtual machine during instantiation of the instantiated virtual machine.

20. The computer-implemented method of claim 18, wherein the authorized storage is enabled responsive to the audit system verifying the individualized audit credentials with an authorization system and responsively receiving an authorization status transferred by the authorization system.

21. The computer-implemented method of claim 18, wherein the information regarding de-authorization of the instantiated virtual machine comprises the individualized audit credentials of the de-authorized instantiated virtual machine.

22. The computer-implemented method of claim 18, wherein the instantiated virtual machine is authorized to store the first audit data based on an authorization system receiving authorization check messages transferred by the audit system and responsively providing the audit system with authorization status messages indicating that the instantiated virtual machine is authorized to store the first audit data.

* * * * *